Aug. 8, 1939.  S. JOHNSON, JR  2,168,480
STEERING MECHANISM
Filed April 14, 1934  2 Sheets-Sheet 1

Inventor
Stephen Johnson Jr.
By N. D. Parker Jr.
Attorney

Aug. 8, 1939.  S. JOHNSON, JR  2,168,480
STEERING MECHANISM
Filed April 14, 1934  2 Sheets-Sheet 2
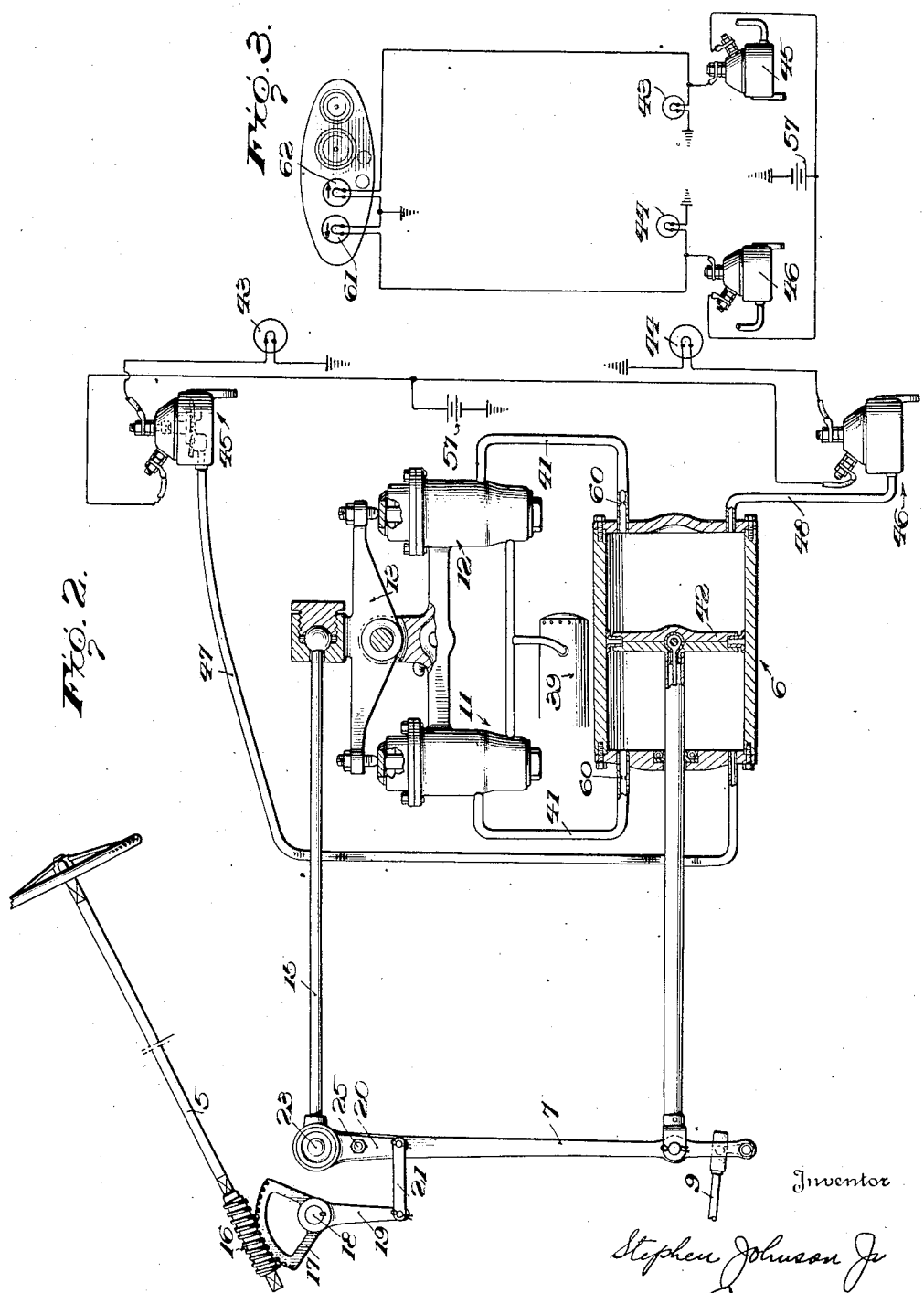

Patented Aug. 8, 1939

2,168,480

UNITED STATES PATENT OFFICE 2,168,480

STEERING MECHANISM

Stephen Johnson, Jr., Pittsburgh, Pa., assignor to Bendix-Westinghouse Automotive Air Brake Company, Pittsburgh, Pa., a corporation of Delaware Application April 14, 1934, Serial No. 720,652

6 Claims. (Cl. 177—339)

This invention relates to vehicle controlling mechanism and more particularly to a combined power-steering device and signalling apparatus adapted for use in connection with vehicles having dirigible wheels.

One of the objects of the present invention is to provide a novel combined power-steering and signalling construction for use in connection with motor vehicles so constructed and arranged that the direction of steering of a vehicle embodying such equipment will be automatically indicated to following vehicles.

Another object of the present invention is to provide in a motor vehicle power-operated steering mechanism a novel arrangement whereby application of power to the steering mechanism will be readily indicated at the rear of the vehicle in such a manner that indications of the energization of the steering mechanism and hence the direction of movement of the vehicle will be signalled from the rear of the vehicle.

A further object is to provide in a mechanism of the above character a combined power-steering and vehicle direction-indicating system embodying a construction wherein the signalling portion of the mechanism will indicate at all times deviations of the vehicle from a straight course.

A still further object is to provide in a device of the above type a novel fluid pressure-operated system embodying fluid pressure-controlled indicating devices so constructed and arranged with respect to the steering mechanism as to indicate, at the rear of the vehicle, movements of the steering mechanism in reverse directions.

A still further object of the invention is to provide a compact arrangement of parts so constituted as to be readily adaptable to vericles now in use in a simple and efficient manner and one in which indications of the direction of travel of the vehicle will be more completely conveyed to following vehicles than heretofore.

Other advantages and novel features of the invention will appear more fully hereinafter from the following detailed description, when taken in connection with the accompanying drawings, wherein two embodiments of the invention are illustrated. It is to be expressly understood, however, that the drawings are for purposes of illustration only and are not designed as a definition of the limits of the invention, reference being had for this purpose to the appended claims.

In the drawings, wherein similar reference characters refer to similar parts throughout the several views:

Fig. 2 is a side view partly in section of a second form of the invention, and

Fig. 3 is a diagrammatic view of a portion of the signalling equipment.

Figure 1:
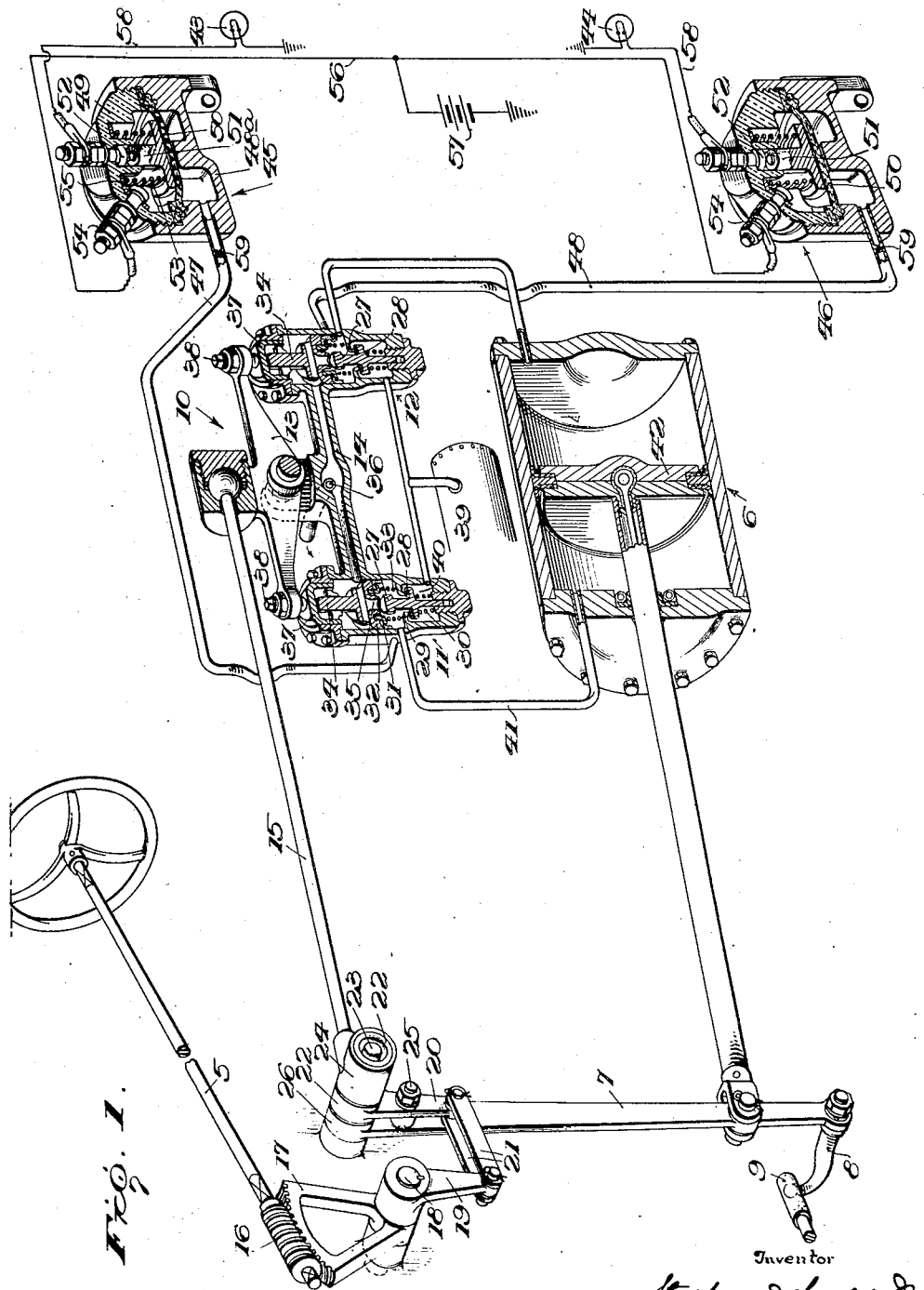
Fig. 1 is a perspective view partly in section of a combined power-steering mechanism and signalling device constructed in accordance with the present invention.

Referring more particularly to Fig. 1, the present invention is disclosed therein as being associated with a power-operated steering mechanism for the dirigible wheels of vehicles and includes a manually-operable steering column 5 adapted to control the flow of fluid power to a double-acting motor 6 which, upon actuation in either direction, is adapted to effect oscillation of a power-operated pitman or steering arm 7 having a connection 8 to a drag arm 9 of a conventional type of steering mechanism found upon motor vehicles.

Means are provided for controlling the application of fluid to the motor 6, and, as shown, such means are manually operated through the rotation of steering column 5 in either direction. Preferably, there is employed a valve mechanism 10 comprising similar valve devices 11 and 12 which are adapted to be selectively operated by a rocker arm 13 pivotally connected to a stationary casing 14, the rocker 13 being suitably connected to an actuating rod 15 adapted to be reciprocated longitudinally in either direction. In order to effect such movement of the valve control rod by the steering column 5, the latter is provided with a worm 16 meshing with a worm segment 17, which latter is suitably secured to a shaft 18 rotatably mounted on the vehicle frame. An arm 19 also secured to the shaft 18 is associated with a valve control lever 20 as by means of links 21 pivotally connected to one end of each of the members 19 and 20. The latter is provided at its opposite end with a hub portion 22 extending laterally and surrounding, but spaced from, a stationary stub shaft 23, the hub 22 being adapted to rotatably receive a sleeve 24 suitably secured to one end of the valve control rod 15. In order to associate the valve control lever 20 and the power-operated steering arm 7, these two members are pivotally connected intermediate their ends as by means of a pin 25, the upper extremity of the steering arm 7 being formed as a hub 26 surrounding and journalled on the stub shaft 23.

The above arrangement is such that movement of the steering column 5 in one direction will effect oscillation of the valve control lever 20 about the pivot 25 to cause operation of the valve mechanism 10 for the purpose of controlling application of fluid under pressure to the motor 6 in such a manner that power-operated movement of the steering arm 7 to vary the direction of steering of the vehicle will tend to move pivot 25 in the direction to permit valve closing movement of the lever 20.

Movement of the steering column 5 in the other direction will cause a reversal of the above described movements, it being borne in mind that as soon as the fluid motor 6 becomes operative, the movement of the steering arm 7 is in such a direction as to constantly tend to discontinue the supply of fluid power to the motor.

Each of the valve mechanisms 11 and 12 includes a normally open exhaust valve 27 and a normally closed intake valve 28, each of the latter valves being resiliently urged against a seat 29, integrally formed with the valve casing, as by means of a spring 30. The exhaust valve 27 is adapted to cooperate with a seat 31 formed in a piston member 32, the latter being normally urged upwardly as shown, as by means of a spring 33. A valve-actuating stem 34 suitably connected or integrally formed with the piston 32 is provided with ports 35 permitting the free exhaustion of fluid under pressure below the piston 32 to an exhaust opening 36, and this stem is provided with a cap 37 in constant engagement with an adjustable screw 38 carried by the end of rocker arm 13.

From the above construction, it will be readily understood that movement of the steering column 5 in either direction will, as heretofore pointed out, move the valve control rod 15 in such a direction as to operate the desired valve 11 or 12. In the event that valve 11 is operated, the exhaust 27 will be first closed by downward movement of piston 32 and the intake valve 28 subsequently opened to permit fluid under pressure to be admitted from reservoir 39 to valve chamber 40 past open valve 28 and through line 41 to the left hand portion of the power device 6. The piston 42 of said power device will thereupon be moved to the right to effect oscillation of the steering arm 7 and connected steering mechanism in the desired direction, it being pointed out that as pressure on the steering column 5 is relieved, movement of the steering arm 7 and pivot 25 carried thereby will be in such a direction as to relieve the applied pressure on valve-controlled rod 15. Under such circumstances, the increase in pressure of the fluid beneath piston 32 of the valve mechanism 11 moves the valve assembly upwardly to lap the intake valve 28.

Movement of the steering column in the opposite direction will effect operation of the valve mechanism 12 to cause oscillation of the steering arm 7 in the opposite direction in a similar manner.

In order that a vehicle equipped with the above described steering mechanism may readily indicate or signal to a following vehicle the direction of movement of the steering arm 7 and hence the direction of movement of the dirigible wheels of the vehicle away from and toward a straight course, means are associated with the power steering mechanisms for visibly signalling such indications. As shown in Fig. 1, such signalling apparatus includes electric lamps or indicators 43 and 44 positioned at the rear of the vehicle at each side thereof, the control of such lamps being effected by fluid pressure-operated switches 45 and 46 respectively, such last mentioned devices being respectively associated with valve mechanisms 11 and 12 through conduits 47 and 48.

Each of the fluid-operated switches 45 and 46 comprises a casing 48ᵃ provided with a cap 49 between which an insulated flexible diaphragm 50 is interposed. The said diaphragm carries a contact member 51 normally spaced from contact member 52 as by means of a spring 53, the latter being in electrically-conductive relationship with the contact 51 and with a terminal 54 as by means of a metal strip 55. The terminal member 54 of each of the pressure-operated switches is connected by a common lead 56 to one terminal of a battery 57, the other terminal of which is grounded, while each of the lamps 43 and 44 is associated with the contacts 52 of the respective switches by means of leads 58. From the above construction, it will be appreciated that any increase of pressure below the diaphragm 50 sufficient to overcome the tension of spring 53 will effect a closure of contacts 51 and 52, thus establishing a circuit between leads 56 to permit a current flow through the proper indicating lamp.

In certain instances, it may be desirable to delay the action of the fluid pressure-operated switches 45 and 46 somewhat so as to insure that said switches will operate only when a predetermined pressure is applied thereto. This may be effected by inserting suitable restricting or flow-retarding means such as choke devices 59 in the fluid supply line to said switches or the result may be attained by increasing the pressure of springs 53 or otherwise adjusting the fluid pressure-operating switches such as varying the separation of contacts 51 and 52. From the above arrangement, it will be readily perceived that as soon as the valve mechanism 11 has been operated to permit flow of fluid under pressure to the valve chamber beneath the piston 32, fluid will not only be conducted to the power device 6 but will also be led to the pressure-operated switch 45 and the latter will be actuated to effect energization of the signal 43 indicating movement of steering arm 7 to the right as viewed in this figure and corresponding steering of the vehicle to the right. As soon, however, as the vehicle has been turned sufficiently in this direction and it is desired to resume a straight course, it is necessary to move valve 11 to exhaust position and operate valve 12 to admit fluid under pressure to the other side of the power device 6. When these operations are effected, the fluid pressure-operated switch 45 will become deenergized and opened, while the switch 46 will operate to energize the left signal 44 in order to indicate to the following vehicles a movement of the steering arm to the left as viewed in this figure and a return of the vehicle to a straight course.

Referring to Fig. 2, the arrangement shown therein is similar to that shown in Fig. 1 with the exceptions that the fluid pressure-operated switches 45 and 46 are associated directly with the power actuator 6 instead of being connected with the valves 11 and 12, and flow-retarding choking devices 60 have been inserted in each of the lines 41 connecting the valves 11 and 12 with the power device 6. These latter devices are utilized for preventing small increments of pressure from operating the power-steering mechanism and the indicators at the rear of the vehicle. Due to such action of the choking devices 60 and to the fact that the pressure-operated switches 45 and 46 are associated directly with the power actuator, the operation of such switches, only in the event that an appreciable pressure is applied to the actuator for steering purposes, is assured.

In Fig. 3, a portion of the signalling equipment is illustrated and includes a pair of signal lamps 61 and 62 arranged in parallel with respect to lamps 44 and 43 respectively and located upon the instrument board of the vehicle in order to apprise the operator that the rear signalling devices are functioning properly. This arrangement also has the added advantage of dispensing with the necessity of an operator having to manually signal a turn from a stop, since it is merely necessary prior to starting the vehicle to turn the steering wheel in the desired direction thereby energizing either the lamps 44 and 61 or 43 and 62, thus signalling the following vehicle that a turn in the indicated direction will be made.

There is thus provided by the present invention a novel combined power-steering apparatus and signalling device for motor vehicles, so constituted as to convey to other vehicles complete information as to the direction of steering. By controlling the signalling equipment by fluid pressure-operated means, a greater flexibility of the system is obtained since such equipment may be remotely located with respect to the steering mechanism. Moreover, by the provision of such signalling equipment in connection with a power-steering mechanism of the type disclosed, a more accurate indication of the direction of steering of a vehicle equipped with the invention is conveyed to following vehicles since a directional signal is illuminated each time the direction of movement of the steering mechanism is varied.

While only two forms of the invention have been illustrated and described herein, it will be understood that various changes may be made therein without departing from the spirit of the invention. Reference will, therefore, be had to the appended claims for a definition of the limits thereof.

What is claimed is:

1. In combination with an automotive vehicle, an oscillatable member for steering the vehicle, a steering column, connecting means therebetween including a lost motion device, power operated signal devices for indicating a change in direction of movement of said oscillatable member, said first named means being adapted on initial movement of said steering column from any steering position for energizing one of said signal devices and responsive to further movement thereof for imparting movement to said oscillatable arm.

2. In combination with an automotive vehicle, steering mechanism including an oscillatable steering arm and a steering column having a mechanical connection therewith and being adapted for limited relative movement therebetween, a source of fluid pressure, valvular means associated with said connection for releasing fluid pressure from said source in response to relative movements of said steering column and arm, and signal means responsive to release of pressure from said source for indicating any change in direction of oscillatable movement of said steering arm.

3. In a motor vehicle steering mechanism having a steering column and an oscillatable member for steering said vehicle in either direction, means including a lost motion device for connecting said steering column and member, and means responsive to any change in the direction of oscillatable movement of said steering column relative to said oscillatable member for indicating a corresponding proposed change in direction of movement of said oscillatable member.

4. In an automotive vehicle having dirigible wheels, a steering member for guiding said wheels and vehicle on any predetermined path, a steering column operatively connected to said member and adapted for limited relative movement with respect thereto, right and left direction signal devices, and means responsive to relative movement of said steering column and member in either direction for actuating either of said devices for indicating a deviation of said wheels from any predetermined path.

5. In combination with a vehicle steering mechanism, a pair of circuits each including a directional signal device, a power supply, circuit closing means for connecting one or the other of said circuits to said power supply in accordance with the direction of movement of said steering mechanism when the latter is operated to turn the vehicle off of any predetermined course including a straight-away course and for maintaining the circuit closed as long as the turn is continued or increased, means operating after the closure of one circuit to open said circuit and close the other upon reversal of turn toward the predetermined course, and automatic means for positively opening both circuits when said steering gear is operating to maintain the vehicle on a substantially straight-away course.

6. In a vehicle direction indicator, means for automatically indicating the direction of turn-off from any predetermined path, said indicating means including visible left and right indicators and being operable irrespective of the degree of turn in either direction, said first mentioned means including means automatically and substantially immediately changing the indication to give a positive indication of a turn in an opposite direction of right or left on said visible indicating means whenever the angle of turn is decreased or reversed, and means for automatically suppressing all indication when the vehicle is following a substantially straight-away path.

STEPHEN JOHNSON, Jr.